(12) United States Patent
Lee et al.

(10) Patent No.: US 7,466,833 B2
(45) Date of Patent: Dec. 16, 2008

(54) BONE VIBRATING SPEAKER USING THE DIAPHRAGM AND MOBILE PHONE THEREBY

(75) Inventors: Oug-Ki Lee, Seoul (KR); Joo-Bae Kim, Bucheon-shi (KR)

(73) Assignee: Phicom Corporation, Seoul (KR)

( * ) Notice: Subject to any disclaimer, the term of this patent is extended or adjusted under 35 U.S.C. 154(b) by 615 days.

(21) Appl. No.: 10/529,656

(22) PCT Filed: Jul. 24, 2003

(86) PCT No.: PCT/KR03/01480

§ 371 (c)(1),
(2), (4) Date: Jul. 8, 2005

(87) PCT Pub. No.: WO02/25989

PCT Pub. Date: Mar. 28, 2002

(65) Prior Publication Data

US 2006/0262954 A1    Nov. 23, 2006

(30) Foreign Application Priority Data

Oct. 2, 2002    (KR)    ...................... 10-2002-0060003

(51) Int. Cl.
*H04R 25/00*    (2006.01)

(52) U.S. Cl. ...................................... 381/151; 381/326

(58) Field of Classification Search ................... 600/25; 607/56, 57; 379/430, 433.02; 381/151, 152, 381/318, 326, 380, 396, 412, 417
See application file for complete search history.

(56) References Cited

U.S. PATENT DOCUMENTS 6,483,917 B1 * 11/2002 Kang et al. ............ 379/433.02
6,850,138 B1 *  2/2005 Sakai ......................... 381/396

FOREIGN PATENT DOCUMENTS

JP        58182398 A  * 10/1983
WO    WO 02/25989 A1  *  3/2002

* cited by examiner

*Primary Examiner*—Brian Ensey
(74) *Attorney, Agent, or Firm*—Daly, Crowley, Mofford & Durkee, LLP

(57) ABSTRACT

In a bone conduction speaker, a body has a shape of a cylinder, and a vibrating plate is inserted to a mastoid to close an upper opening portion of the body. An auxiliary vibrating plate is inserted to the mastoid under the vibrating plate. A vibrating coil is attached on a lower side of the auxiliary vibrating plate. A speaker plate is fixed at an inner central portion of the body, and a ring type magnet is fixed on the speaker plate. An edge portion of a yoke is fixed on the ring type magnet and a central portion of the yoke has a protrusion which protrudes in the inside direction of a central hole of the speaker plate. An acoustic vibrating plate is fixed at a lower portion of the body, and an acoustic coil is fixed on the acoustic vibrating plate.

10 Claims, 5 Drawing Sheets

BONE VIBRATING SPEAKER USING THE DIAPHRAGM AND MOBILE PHONE THEREBY

CROSS-REFERENCE TO RELATED APPLICATIONS

This application is a National Stage application under 35 U.S.C. §371 of and claims the benefit of International Application No. PCT/KR2003/001480, filed on Jul. 24, 2003, published in the English language on Apr. 14, 2004 as International Publication Number WO 2004/032566 A1, which claims priority to Korean Application No. 10-2002-0060003, filed on Oct. 2, 2002, which are hereby incorporated by reference.

TECHNICAL FIELD

The present invention relates to a bone conduction speaker by using a vibrating plate and a mobile phone having the bone conduction speaker, and more specifically, to a two-way bone conduction speaker having an acoustic speaker function in which a sound wave transmitted by a vibration of air vibrates a tympanic membrane of a human body and stimulate an auditory nerve to facilitate the hearing of the sound, thereby being capable of directly vibrating skull bone and stimulating the auditory nerve, so that the sound can be heard and a mobile phone having the bone conduction speaker.

BACKGROUND ART

Generally, a sound that is heard by human beings is a wave. The sound wave that is transmitted to the ears of the human beings vibrates the air molecules within the ears. The movement of the molecules, in turn, vibrates the tympanic membrane, that is, eardrum, so that the human beings can hear the sound.

The sound wave entering the external ears of the human beings is transmitted to the tympanic membrane. The vibration of the tympanic membrane generated by the sound wave is transmitted to the cells of the internal ears, so that the human beings can hear the sound.

The audible frequency in which the human beings can hear the sound is within the range of 20 Hz to 20,000 Hz. The best audible frequency range, that is, so called 'communication voice range' is 125 Hz to 8,000 Hz. Commonly, the human beings use the range of 500 Hz to 2,000 Hz for their communication.

Most of the human beings can hear the sound in the range of 20 Hz to 20,000 Hz. However, some of the human beings having auditory disorders such as disorders of external ears or middle ears, presbycusis which is a hearing loss that gradually occurs, as they grow older, and hearing loss as an occupational disease cannot hear the sound in the only specific frequency range or all over the frequency range.

A bone conduction telephone and a hearing aid vibrator by using a piezoelectric device which is used for such people having hearing loss are disclosed in the Korean Utility Model Registration No. 221534.

The bone conduction telephone and the hearing aid vibrator by using the piezoelectric device according to the utility model in the Korean Utility Model Registration No. 221534 comprises the piezoelectric device 100 which generates a physical vibration by an electric voice signal being applied, vibrating plates 110 disposed at both end side of the piezoelectric device 100 to apply the electrical signal to the piezoelectric device 100 through a conducting wire 130, an electrode plate 120, a front contacting portion 140 connected to the electrode plate 120 to transmit the vibrating to the exterior, and a cover 150 which supports and protects the piezoelectric device 100. In the utility model, the piezoelectric device 100 generates a vibration with piezoelectric effect. The generated vibration has a voice frequency corresponding to the electrical voice signal which is applied through the vibrating plates 110 and the electrode plate 120. The generated vibration is transmitted to the exterior as a vibration signal.

However, bone conduction telephone and the hearing aid vibrator by using the piezoelectric device according to the utility model are too theoretical to be implemented. The utility model has so many problems for its commercial implementation. Since the piezoelectric device has high impedance and high input voltage, the output sound pressure is too low and the miniaturization of the products is too difficult.

In order to solve the aforementioned problems, a bone conduction hearing aid apparatus and a bone conduction telephone have been proposed and developed to directly vibrate skull bone and stimulate the auditory nerve for hearing the sound.

The bone conduction speaker which directly vibrates the skull bone and stimulates the auditory nerve for hearing the sound is disclosed in the Korean Patent Registration No. 310891 which is registered on Sep. 21, 2001.

The bone conduction speaker disclosed in the Korean Patent Registration No. 310891 comprises a frame having a side wall and a lower wall to define a certain space; a protector of which an inner side peripheral portion is combined to an upper surface of the side wall and of which a center has an opening; a damper for reducing intensities of vibration and sound by performing stabilized vibration, wherein the damper is disposed between the upper end of the side wall and the lower surface of the inner side peripheral portion; a main body for supporting the inner side end of the damper, wherein the main body is disposed within the space; an extending portion which is incorporated into the main body and extended downwardly; an yoke for focusing magnetic flux; a magnet which is disposed at the interior of the extending portion and of which upper surface is closely contacted to the lower surface of the main body; an upper plate which is disposed at the interior of the extending portion to form a magnetic circuit together with the yoke and the magnet; a vibration contacting portion which is externally exposed through the opening to be directly contacted to the head of human beings; a fixing means for fixing the protector, the yoke, the magnet, and the upper plate as one body; and a voice coil which is disposed in the clearance between the upper plate, both ends of the magnet, and the inner surface of the extending portion and of which a lower end is fixed to the lower wall.

However, the conventional bone conduction speaker has a problem that high driving voltage and high power consumption are necessary to vibrate the yoke, the magnet, and the upper plate since the yoke, the magnet, and the upper plate serve as parts for generating the magnetic field as well as parts of vibrating upwardly and downwardly.

In addition, in the conventional bone conduction speaker, high strength of the magnetic field is necessary and large sizes of the yoke, the magnet, and the upper plate which are above a specific size are necessary to vibrate the yoke, the magnet, and the upper plate since the yoke, the magnet, and the upper plate serve as parts for generating the magnetic field as well as parts of vibrating upwardly and downwardly.

Therefore, the conventional bone conduction speaker has another problem that it is difficult to be miniaturized and employed to a subminiature mobile phone, a subminiature headset, a hearing aid apparatus, and so on.

Furthermore, in the aforementioned bone conduction speaker, the voice coil is fixed on the base plate and the mastoid, the yoke, the magnet, and the upper plate are vibrated upwardly and downwardly by the magnetic field which is generated by the voice coil. Therefore, the conventional bone conduction speaker has still another problem that it is difficult to transmit the vibration of the mastoid to the user accurately since the mastoid which is contacted to the bone skull of the user is difficult to vibrate upwardly and downwardly due to heavy weights of the mastoid, the yoke, the magnet, and the upper plate.

In addition, the conventional bone conduction speaker has further still another problems that it may be easily out of order due to any infinitesimal external impacts and its reliability may be being deteriorated since the internal parts such as the yoke and the magnet for generating the magnetic field are disposed at the upper portion of the bone conduction speaker.

In order to solve the aforementioned problems, the applicant of the present invention filed a dual application of a patent application (Korean Patent Application No. 10-2002-0048318) and a utility model application (Korean Utility Model Application No.20-2002-0024417), tiled "a subminiature bone conduction speaker by using a vibrating plate and a mobile phone having the same," on Aug. 16, 2002 with the Korean Intellectual Property Office.

Although the aforementioned subminiature bone conduction speaker by using a vibrating plate has advantages that it is possible to reduce a driving voltage for reducing power consumption, to easily facilitate the miniaturization of the bone conduction speaker, to accurately transmit the signal sound to a user, and to have good resistance against an external impact, it has a problem that the user cannot hear sounds selectively.

Therefore, development of an advanced bone conduction speaker having a function of a subminiature bone conduction speaker together with a function of a general speaker for hearing sounds has been greatly needed.

DISCLOSURE OF INVENTION

An object of the present invention is to a bone conduction speaker having a function of vibrational hearing together with a function of acoustic hearing and a mobile phone having the bone conduction speaker.

In order to achieve the object, a bone conduction speaker using a vibrating plate according to the present invention is characterized in that the bone conduction speaker comprises: a body having a shape of a cylinder with an upper portion and a lower portion opened; a mastoid having a lower diameter and an upper diameter, wherein the lower diameter is relatively smaller than the upper diameter; a vibrating plate being inserted to a lower portion of the mastoid to close an upper opening portion of the body, wherein the vibrating plate is made of an elastic material; an auxiliary vibrating plate being inserted to a lower portion of the mastoid under the vibrating plate which is inserted to the mastoid; a vibrating coil being attached on a lower side of the auxiliary vibrating plate; a speaker plate being fixed at an inner central portion of the body having the shape of the cylinder, wherein a central hole is provided at the central portion of the speaker plate; a ring type magnet being fixed on the speaker plate; a yoke, wherein an edge portion of the yoke is fixed on the ring type magnet and a central portion of the yoke has a protrusion which protrudes in the inside direction of the central hole of the speaker plate; an acoustic vibrating plate being fixed at a lower portion of the body to close a lower plane of the body; an acoustic coil being fixed on the acoustic vibrating plate and being inserted between the ring type magnet and the yoke; and an electrical signal input unit for applying a predetermined electrical signal to at least one of the vibrating coil and acoustic coil.

In the aforementioned bone conduction speaker, the vibrating plate may be inserted into a first groove which is formed at an upper portion of the body, and then fixed to the body with the front cap.

In addition, in the aforementioned bone conduction speaker, howling preventing holes may be formed in at least one of the mastoid, the auxiliary vibration plate, and the protrusion of the yoke.

In addition, in the aforementioned bone conduction speaker, the speaker plate may be fixed by being inserted into a second groove which is formed at a central portion within the body, and a speaker protective cap may be further provided to a lower side of the acoustic vibrating plate.

In addition, in the aforementioned bone conduction speaker, an acoustic hole may be further provided to the speaker protective cap. Furthermore, in the aforementioned bone conduction speaker, the acoustic vibrating plate may be made of beryllium copper. Moreover, in the aforementioned bone conduction speaker, the ring type magnet is made of neodymium material.

In addition, in the aforementioned bone conduction speaker, the electrical signal input unit comprises: a first outgoing line being connected to the vibrating plate and extended to the exterior of the body; a second outgoing line being connected to the acoustic vibrating plate and extended to the exterior of the body; and a connection terminal being provided to the exterior of the body, wherein the connection terminal is connected to the first and second outgoing lines, and wherein the electrical signal is input to at least one of the first and second outgoing lines through the connection terminal.

In addition, a mobile phone according to the present invention is characterized in that the mobile phone comprises a bone conduction speaker, wherein the bone conduction speaker comprises: a body having a shape of a cylinder with an upper portion and a lower portion opened; a mastoid having a lower diameter and an upper diameter, wherein the lower diameter is relatively smaller than the upper diameter; a vibrating plate being inserted to a lower portion of the mastoid to close an upper opening portion of the body, wherein the vibrating plate is made of an elastic material; an auxiliary vibrating plate being inserted to a lower portion of the mastoid under the vibrating plate which is inserted to the mastoid; a vibrating coil being attached on a lower side of the auxiliary vibrating plate; a speaker plate being fixed at an inner central portion of the body having the shape of the cylinder, wherein a central hole is provided at the central portion of the speaker plate; a ring type magnet being fixed on the speaker plate; a yoke, wherein an edge portion of the yoke is fixed on the ring type magnet and a central portion of the yoke has a protrusion which protrudes in the inside direction of the central hole of the speaker plate; an acoustic vibrating plate being fixed at a lower portion of the body to close a lower plane of the body; an acoustic coil being fixed on the acoustic vibrating plate and being inserted between the ring type magnet and the yoke; and an electrical signal input unit for applying a predetermined electrical signal to at least one of the vibrating coil and acoustic coil.

According to the present invention, the bone conduction speaker has a function of vibrational hearing together with a function of an acoustic hearing, so that it is possible to obtain an effect that the user can select one of the functions in accordance with the environments.

In addition, the contents of the communication can be heard by the sounding persons as well as the user, so that it is possible to obtain another effect for giving a convenience for usage of a mobile phone.

BEST MODE FOR CARRYING OUT THE INVENTION

Now, the preferred embodiments according to the present invention will be described in detail with reference to the accompanying drawings.

Figure 1:
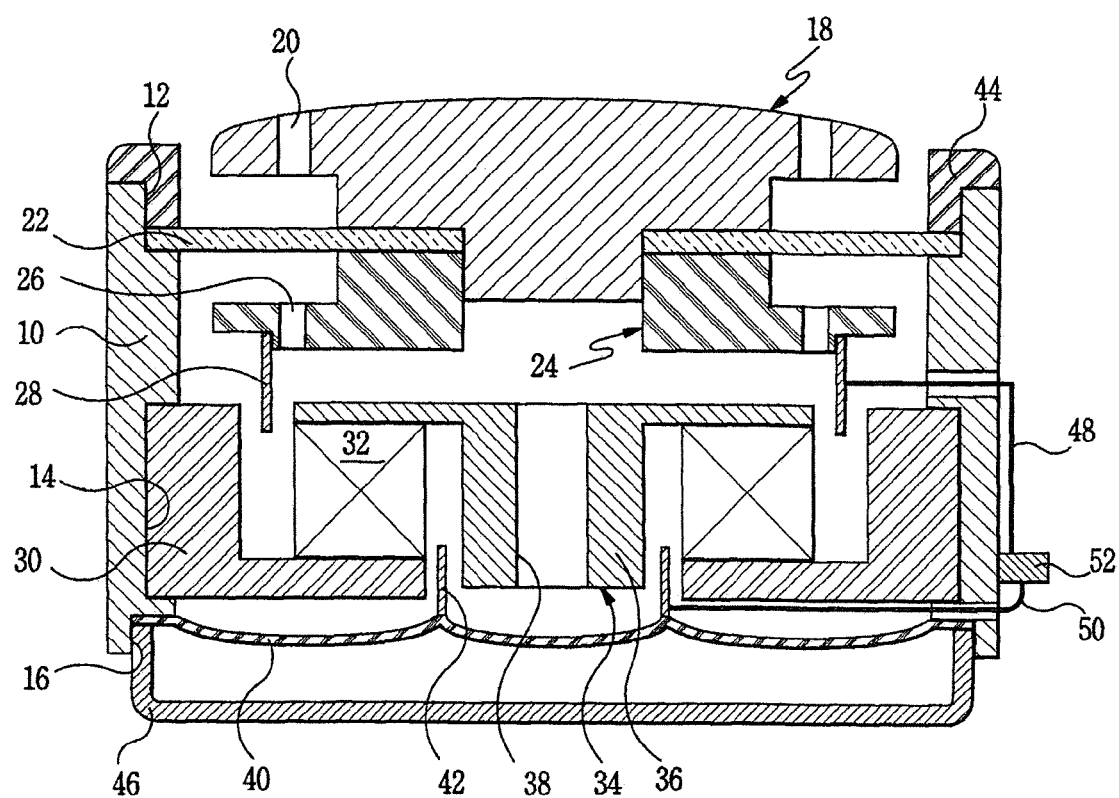
FIG. 1 is a cross sectional view of a bone conduction speaker using a vibrating plate according to a first embodiment of the present invention.

The bone conduction speaker according to a first embodiment of the present invention comprises a body 10 which has a shape of a cylinder with its upper and lower portions opened, as shown in FIG. 1. In the body, two through-holes (not indicated with reference numerals) are formed to connect to an external portion at one side upper wall and one side lower wall.

A first groove 12 is formed at the upper portion of the body 10, a second groove 14 is formed at the central portion of the body 10, and a third groove 16 is formed at the lower portion of the body 10.

In addition, the body 10 is constructed with a plastic material for sub-miniaturization. A connection terminal 52 to which an electrical signal is applied from the exterior is formed at a predetermined outer side portion of the body 10.

A mastoid 18 which is made of a plastic material is formed on the upper portion of the body 10. The lower diameter of the mastoid 18 is smaller that is upper diameter thereof. The vibrating plate 22 is inserted under the mastoid 18 and engaged into the first groove 12 of the upper portion of the body 10 to cover the top of the body 10. The vibrating plate 22 is made of beryllium copper having a certain elastic force. The auxiliary vibrating plate 24 is formed to be inserted to the lower portion of the mastoid 18 under the vibrating plate 22.

In addition, a vibrating coil 28 is attached at the lower side of the auxiliary vibrating plate 24, and the vibrating plate 22 which is engaged into the first groove 12 of the body 10 is fixed with a front cap 44.

In the mastoid 18 and the auxiliary vibrating plate 24, howling preventing holes 20 and 26 are formed to prevent the howling effect at ears of the user, respectively.

The mastoid 18, the vibrating plate 22, and the auxiliary vibrating plate 24 are engaged by a pressure inserting method. In particular, an ultrasonic vibration attachment and a reinforcing attachment by using an adhesive are carried out on the contacting portions of the mastoid 18, the vibrating plate 22, and the auxiliary vibrating plate 24. And then, a drying process is carried out on the contacting portions for 4 hours.

The vibrating coil 28 which is fixed at the lower side of the auxiliary vibrating plate 24 is attached downwardly under the auxiliary vibrating plate 24 by an adhesive of heat-resistant rubber.

A speaker plate 30 which is made of a conductive material and has a central hole (not indicated with a reference numeral) is formed at the lower side of the auxiliary vibrating plate 24, more specifically, at the center within a second groove 14 of the body 10. On the speaker plate 30, a ring type magnet 32 which is made of neodymium, Nd, is fixed at a position adjacent to the central hole of the speaker plate 30 by an adhesive.

In addition, an edge portion of yoke 34 is formed is mounted on the ring type magnet 32. In the central portion of the yoke 34, a protrusion 36 is provided to protrude inwardly into the central hole of the speaker plate 30. A howling preventing hole 38 is also provided to the protrusion 36 of the yoke 34.

In addition, an acoustic vibrating plate 40 is fixed at a third fixing groove 16 of the body 10 by a speaker protection cap 46. An acoustic coil 42 is fixed on the acoustic vibrating plate 40 and inserted between the ring type magnet 32 and the yoke 34. The acoustic vibrating plate 40 is attached upwardly on the acoustic vibrating plate 40 by an adhesive of heat-resistant rubber.

The vibrating coil 28 is connected with a first outgoing line 48, of which surface is coated with an insulating material against its short circuit. The first outgoing line 48 which comprises a positive terminal line and a negative terminal line is passed through the through-hole and connected to the connection terminal 52 with a soldering method. The connection terminal 52 is formed on the outer side of the body 10. In addition, the acoustic vibrating coil 42 is also connected with a second outgoing line 50, of which surface is coated with an insulating material against its short circuit. The second outgoing line 50 which comprises a positive terminal line and a negative terminal line is passed through the lower through-hole and connected to the connection terminal 52 with a soldering method.

Now, the structure of the connection terminal 52 and the operation for performing selectively the vibration hearing function and the acoustic hearing function in accordance with the states of the input electrical signals from the connection terminal 52 will be described with reference to FIG. 3a.

Figure 3A:
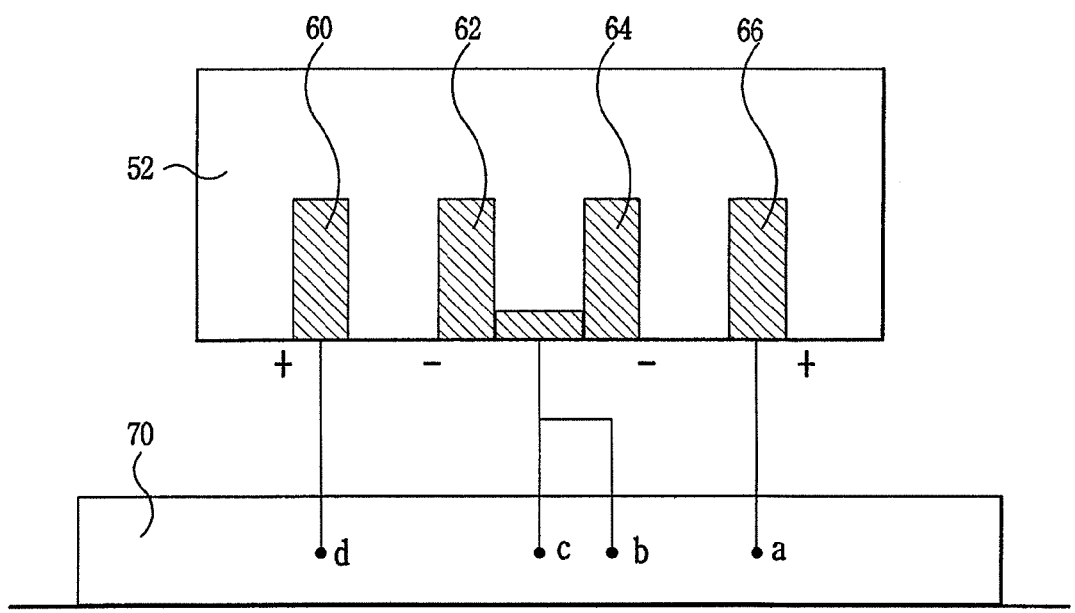
FIG. 3a is a structural view for explaining the one state in which an electrical signal is applied to the bone conduction speaker using the vibrating plate shown in FIGS. 1 and 2.

Referring to FIG. 3a, four contact portions 60, 62, 64, and 66 are formed to be separated from each other in the connection terminal. The first contact portion 60 is connected to the positive terminal line of the second outgoing line 50. The second contact portion 62 is connected to the negative terminal line of the second outgoing line 50. The third contact portion 64 is connected to the negative terminal line of the first outgoing line 48. The fourth contact portion 66 is connected to the positive terminal line of the first outgoing line 48.

In addition, the positive terminal line of the second outgoing line 50 which is connected to the first contacting portion 60 is extended to connect to a point d of the electrical signal input unit 70. The negative terminal line of the second outgoing line 50 which is connected to the second contacting portion 62 is extended to connect to points b and c of the electrical signal input unit 70.

The positive terminal line of the first outgoing line 48 which is connected to the fourth contacting portion 66 is extended to connect to a point a of the electrical signal input unit 70.

When the electrical signal input unit 70 selects points a and b or points c and d to input a specific electrical signal thereto, the specific electrical signal is applied to one of the vibrating coil 28 and the acoustic coil 42 through the contacting portions 60, 62, 64, 66.

In other words, when the electrical signal input unit 70 applies the specific electrical signal to the vibrating coil 28 or the acoustic coil 42 by selecting the point a and b or the points c and d of the connection terminal 52, the electrical signal is transmitted to the vibrating coil 28 through the first outgoing line 48 via the third and fourth contacting portions 64 and 66, or to the acoustic coil 42 through the second outgoing line 50 via the first and second contacting portions 60 and 62.

In accordance with the applied electrical signal which is transmitted to the vibrating coil 28 or the acoustic coil 42 through the first outgoing line 48 or the second outgoing line 50, respectively, a certain physical force F is generated between the speaker plate 30 around the ring type magnet 32 which is formed in the body 10 and the yoke 34. The physical force F is oscillating upwardly and downwardly in accordance with the Fleming's left hand law.

By the certain physical force F, the vibrating coil 28 is moving upwardly and downwardly. And then, by the movement of the vibrating coil 28, the vibrating plate 22 which is fixed at the first groove 12 of the body 10 and made of an elastic material is vibrated. The upward and downward vibration of the auxiliary vibrating plate 24, the vibrating plate 22, and the mastoid 18 is transmitted through the skull bone of the user to stimulate the auditory nerve. The user can hear the sound by means of the stimulated auditory nerve.

On the other hand, by the certain physical force F, the acoustic coil 42 is moving upwardly and downwardly. And then, by the movement of the acoustic coil 42, the acoustic vibrating plate 40 which is fixed at the third groove 16 of the body 10 and made of an elastic material is vibrated. The sound which is generated by the vibration of the acoustic vibrating plate 40 is reflected at the speaker protection cap 46, and then is transmitted through the howling preventing hole 38 which is formed at the protrusion 36 of the yoke 34, the howling preventing hole 26 of the auxiliary vibrating plate 24, and the howling preventing hole 20 of the mastoid 18 to the user's ears, so that the user can hear the sound directly.

Next, the operation for performing simultaneously the vibrational hearing function and the acoustic hearing function in accordance with the states of the input electrical signals from the connection terminal will be described with reference to FIG. 3b.

Figure 3B:
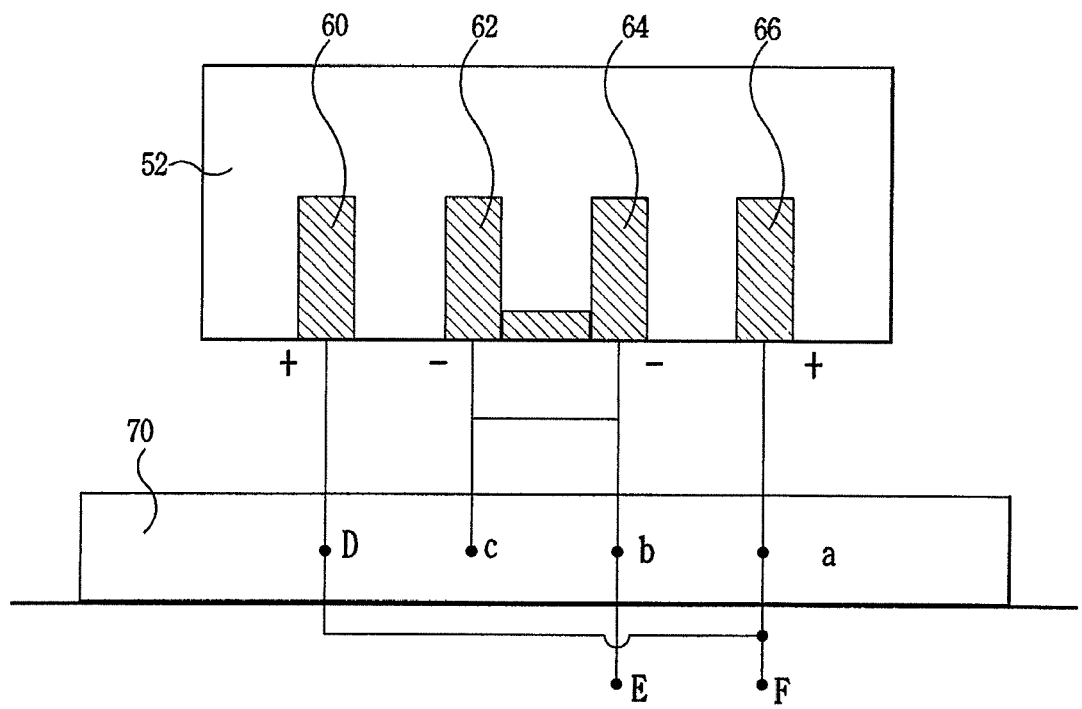
FIG. 3b is a structural view for explaining the other state in which an electrical signal is applied to the bone conduction speaker using the vibrating plate shown in FIGS. 1 and 2.

Referring to FIG. 3b, four contact portions 60, 62, 64, and 66 are formed to be separated from each other in the connection terminal. The first contact portion 60 is connected to the positive terminal line of the second outgoing line 50. The second contact portion 62 is connected to the negative terminal line of the second outgoing line 50. The third contact portion 64 is connected to the negative terminal line of the first outgoing line 48. The fourth contact portion 66 is connected to the positive terminal line of the first outgoing line 48.

In addition, the positive terminal line of the second outgoing line 50 which is connected to the first contacting portion 60 is extended to connect to a point d of the electrical signal input unit 70. The negative terminal line of the second outgoing line 50 which is connected to the second contacting portion 62 is extended to connect to points b and c of the electrical signal input unit 70.

The positive terminal line of the first outgoing line 48 which is connected to the fourth contacting portion 66 is extended to connect to the point a of the electrical signal input unit 70. In addition, the point d is connected to the point a.

In addition, the point b is extended to a point E, and the point a is extended to a point F.

When the electrical signal input unit 70 selects one of the points E and F to input a specific electrical signal thereto, the specific electrical signal is applied to both the vibrating coil 28 and the acoustic coil 42 through the contacting portions 60, 62, 64, 66.

In accordance with the applied electrical signal which is transmitted to the vibrating coil 28 or the acoustic coil 42 through the first outgoing line 48 and the second outgoing line 50, respectively, a certain physical force F is generated between the speaker plate 30 around the ring type magnet 32 which is formed in the body 10 and the yoke 34. The physical force F is oscillating upwardly and downwardly in accordance with the Fleming's left hand law.

By the certain physical force F, the vibrating coil 28 is moving upwardly and downwardly. And then, by the movement of the vibrating coil 28, the vibrating plate 22 which is fixed at the first groove 12 of the body 10 and made of an elastic material is vibrated. The upward and downward vibration of the auxiliary vibrating plate 24, the vibrating plate 22, and the mastoid 18 is transmitted through the skull bone of the user to stimulate the auditory nerve. The user can hear the sound by means of the stimulated auditory nerve.

Simultaneously, by the certain physical force F, the acoustic coil 42 is moving upwardly and downwardly. And then, by the movement of the acoustic coil 42, the acoustic vibrating plate 40 which is fixed at the third groove 16 of the body 10 and made of an elastic material is vibrated. Sound which is generated by the vibration of the acoustic vibrating plate 40 is reflected at the speaker protection cap 46, and then is transmitted through the howling preventing hole 38 which is formed at the protrusion 36 of the yoke 34, the howling preventing hole 26 of the auxiliary vibrating plate 24, and the howling preventing hole 20 of the mastoid 18 to the user's ears, so that the user can hear the sound directly.

Figure 2:
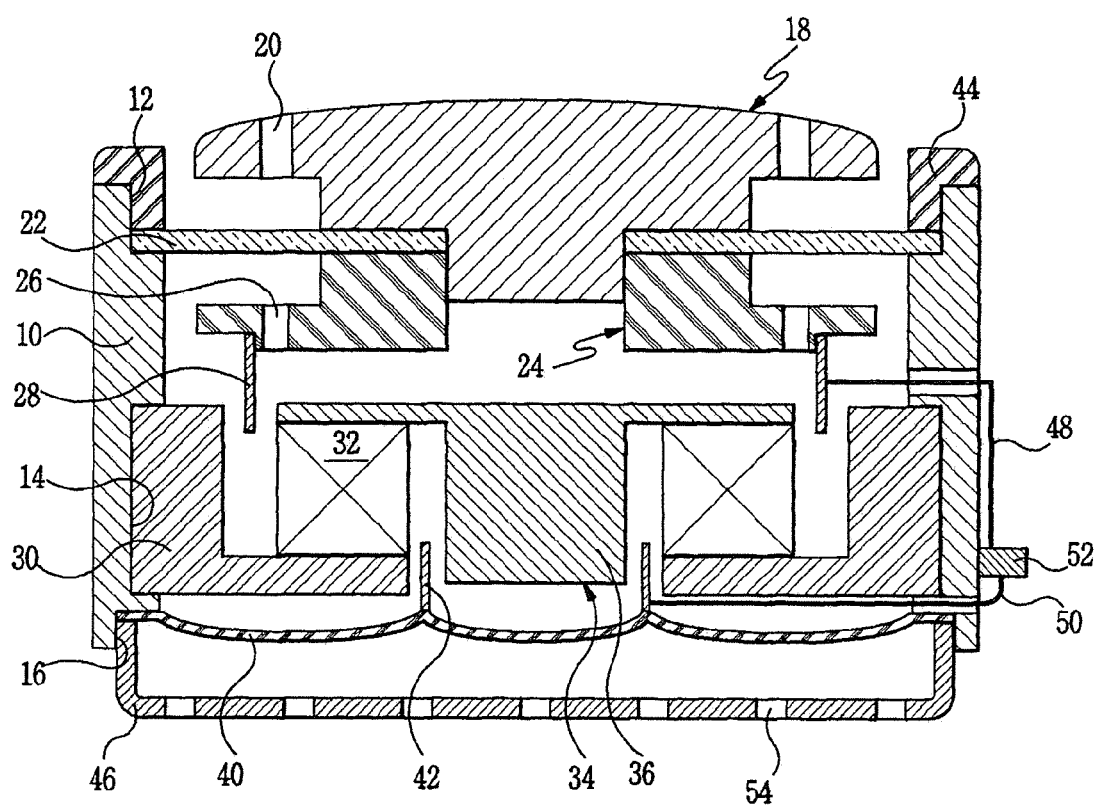
FIG. 2 is a cross sectional view of a bone conduction speaker using a vibrating plate according to a second embodiment of the present invention.

FIG. 2 is a cross sectional view for illustrating a bone conduction speaker according to a second embodiment of the present invention. In FIG. 2, the same parts as those of FIG. 1 are indicated as the same reference numerals, and the description of the same parts and their operations are omitted.

The bone conduction speaker according to the second embodiment of the present invention is characterized in that the howling preventing hole 38 formed at the protrusion 36 of the yoke 34 is closed, and also, a plurality of acoustic holes 54 are added to the speaker protective cap 46, as shown in FIG. 2.

Therefore, by a certain physical force F generated around the ring type magnet 32 in accordance with the electrical signal input of the electrical signal input unit, the vibrating coil 28 is moving upwardly and downwardly. By the movement of the vibrating coil 28, acoustic vibrating plate 40 which is fixed at the third groove 16 of the body 10 and made of an elastic material is vibrated. The sound generated with the vibration of the acoustic vibrating plate 40 is emitted externally through the speaker protection cap 46, so that the sound can be transmitted to the user in the opposite direction of the mastoid 18.

Figure 4:
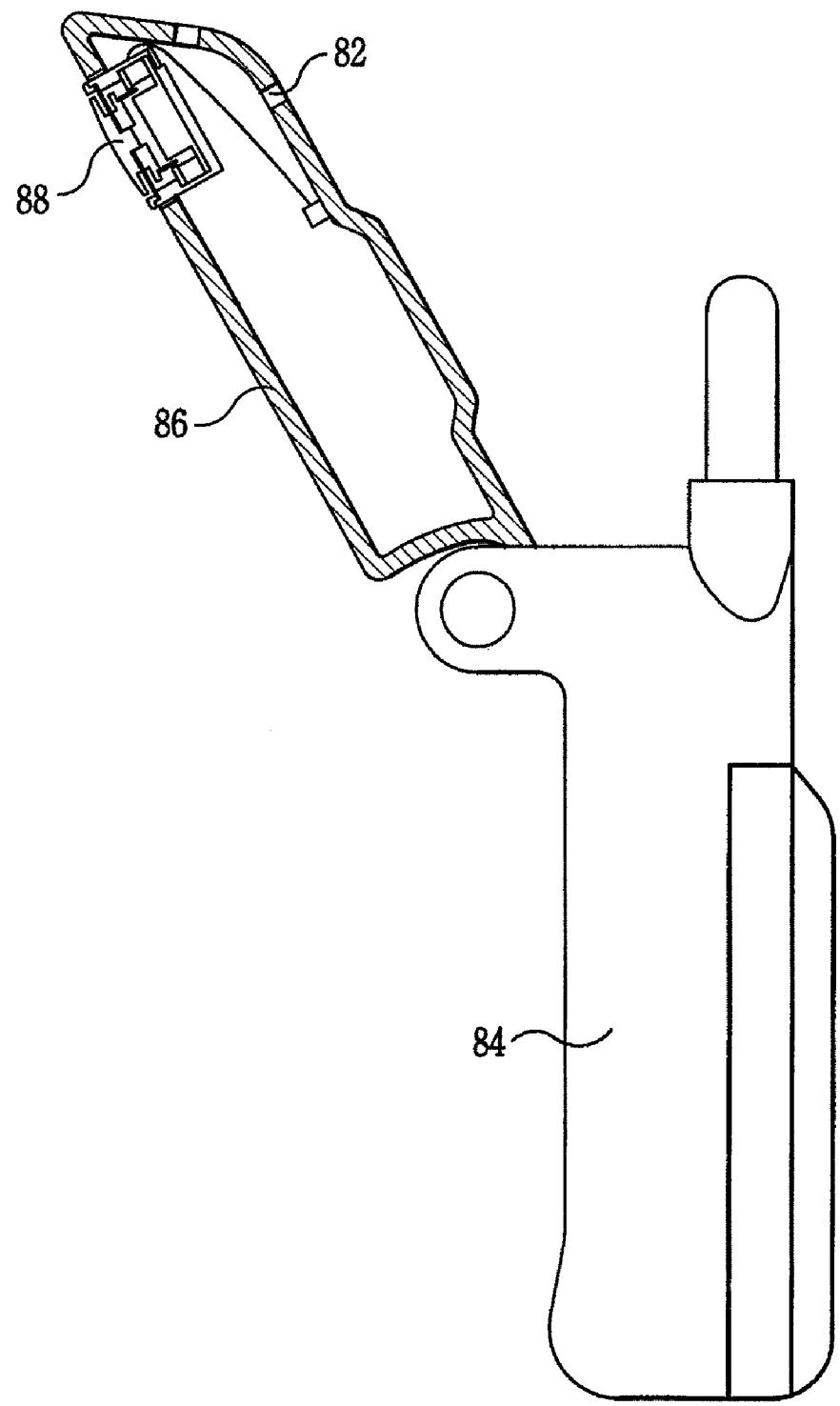
FIG. 4 is a perspective view for explaining a mobile phone comprising the subminiature bone conduction speaker using a vibrating plate shown in FIG. 1.

FIG. 4 is a view for explaining a mobile phone comprising the bone conduction speaker using a vibrating plate according to the present invention.

The mobile phone has a main body portion 84 and a cover 86 and further comprises the bone conduction speaker 88 using a vibrating plate according to the present invention. In the mobile phone, the bone conduction speaker 88 is provided at the inner side of the upper end portion of the cover 86 of the mobile phone, so that the user can hear the sound by the vibrational hearing function and the acoustic hearing function simultaneously. Furthermore, in the case the bone conduction speaker according to the third embodiment is provided to the mobile phone, as shown in FIG. 4, the hole 82 is formed in the outer enclosure of the cover 86, so that the sound emitted through acoustic holes 54 can be heard in the exterior.

Although the present invention and its advantages have been described in detail, it should be understood that the present invention is not limit to the aforementioned embodiment and the accompanying drawings and it should be understood that various changes, substitutions and alterations can be made herein by the skilled in the arts without departing from the sprit and the scope of the present invention as defined by the appended claims.

What is claimed is:

1. A subminiature bone conduction speaker using a vibrating plate comprising:
    a body having a shape of a cylinder with an upper portion and a lower portion opened;
    a mastoid having a lower diameter and an upper diameter, wherein the lower diameter is relatively smaller than the upper diameter;
    a vibrating plate being inserted to a lower portion of the mastoid to close an upper opening portion of the body, wherein the vibrating plate is made of an elastic material;
    an auxiliary vibrating plate being inserted to a lower portion of the mastoid under the vibrating plate which is inserted to the mastoid;
    a vibrating coil being attached on a lower side of the auxiliary vibrating plate;
    a speaker plate being fixed at an inner central portion of the body having the shape of the cylinder, wherein a central hole is provided at the central portion of the speaker plate;
    a ring type magnet being fixed on the speaker plate;
    a yoke, wherein an edge portion of the yoke is fixed on the ring type magnet and a central portion of the yoke has a protrusion which protrudes in the inside direction of the central hole of the speaker plate;
    an acoustic vibrating plate being fixed at a lower portion of the body to close a lower plane of the body;
    an acoustic coil being fixed on the acoustic vibrating plate and being inserted between the ring type magnet and the yoke; and
    an electrical signal input unit for applying a predetermined electrical signal to at least one of the vibrating coil and acoustic coil.

2. A subminiature bone conduction speaker using a vibrating plate according to claim 1, wherein the vibrating plate is inserted into a first groove which is formed at an upper portion of the body, and then fixed to the body with the front cap.

3. A subminiature bone conduction speaker using a vibrating plate according to claim 1, wherein a howling preventing holes is formed in at least one of the mastoid, the auxiliary vibration plate, and the protrusion of the yoke.

4. A subminiature bone conduction speaker using a vibrating plate according to claim 1, wherein the speaker plate is fixed by being inserted into a second groove which is formed at a central portion within the body.

5. A subminiature bone conduction speaker using a vibrating plate according to claim 1, wherein a speaker protective cap is further provided to a lower side of the acoustic vibrating plate.

6. A subminiature bone conduction speaker using a vibrating plate according to claim 5, wherein an acoustic hole is further provided to the speaker protective cap.

7. A subminiature bone conduction speaker using a vibrating plate according to claim 1, wherein the acoustic vibrating plate is made of beryllium copper.

8. A subminiature bone conduction speaker using a vibrating plate according to claim 1, wherein the ring type magnet is made of neodymium material.

9. A subminiature bone conduction speaker using a vibrating plate according to claim 1, wherein the electrical signal input unit comprises: a first outgoing line being connected to the vibrating plate and extended to the exterior of the body;
    a second outgoing line being connected to the acoustic vibrating plate and extended to the exterior of the body; and
    a connection terminal being provided to the exterior of the body, wherein the connection terminal is connected to the first and second outgoing lines, and wherein the electrical signal is input to at least one of the first and second outgoing lines through the connection terminal.

10. A mobile phone comprising a subminiature bone conduction speaker, wherein the subminiature bone conduction speaker comprising:
    a body having a shape of a cylinder with an upper portion and a lower portion opened;
    a mastoid having a lower diameter and an upper diameter, wherein the lower diameter is relatively smaller than the upper diameter;
    a vibrating plate being inserted to a lower portion of the mastoid to close an upper opening portion of the body, wherein the vibrating plate is made of an elastic material;
    an auxiliary vibrating plate being inserted to a lower portion of the mastoid under the vibrating plate which is inserted to the mastoid;
    a vibrating coil being attached on a lower side of the auxiliary vibrating plate;
    a speaker plate being fixed at an inner central portion of the body having the shape of the cylinder, wherein a central hole is provided at the central portion of the speaker plate;
    a ring type magnet being fixed on the speaker plate;
    a yoke, wherein an edge portion of the yoke is fixed on the ring type magnet and a central portion of the yoke has a protrusion which protrudes in the inside direction of the central hole of the speaker plate;
    an acoustic vibrating plate being fixed at a lower portion of the body to close a lower plane of the body;
    an acoustic coil being fixed on the acoustic vibrating plate and being inserted between the ring type magnet and the yoke; and
    an electrical signal input unit for applying a predetermined electrical signal to at least one of the vibrating coil and acoustic coil.

* * * * *